United States Patent [19]

Hsieh

[11] Patent Number: 5,761,200
[45] Date of Patent: Jun. 2, 1998

[54] INTELLIGENT DISTRIBUTED DATA TRANSFER SYSTEM

[75] Inventor: Hsun-Chang Hsieh, Hsinchu, Taiwan

[73] Assignee: Industrial Technology Research Institute, Taiwan

[21] Appl. No.: 147,322

[22] Filed: Oct. 27, 1993

[51] Int. Cl.[6] ............................................. G06F 13/00
[52] U.S. Cl. ...................... 370/364; 370/536; 370/542; 395/200.3; 395/280
[58] Field of Search .............................. 395/800, 200, 395/275, 200.3, 280; 364/DIG. 1; 370/58.2, 364, 536, 542, 543

[56] References Cited

U.S. PATENT DOCUMENTS

| | | | |
|---|---|---|---|
| 4,527,237 | 7/1985 | Frieder et al. | 364/DIG. 1 |
| 4,985,830 | 1/1991 | Atac et al. | 364/DIG. 1 |
| 4,991,110 | 2/1991 | Hannah | 395/517 |
| 5,265,095 | 11/1993 | Fiedler et al. | 370/476 |
| 5,313,589 | 5/1994 | Donaldson et al. | 395/275 |
| 5,349,579 | 9/1994 | Madonna et al. | 370/58.2 |

*Primary Examiner*—Alyssa H. Bowler
*Assistant Examiner*—Walter D. Davis
*Attorney, Agent, or Firm*—Finnegan, Henderson, Farabow, Garrett & Dunner, L.L.P.

[57] ABSTRACT

The present invention discloses a distributed data transfer system for transferring data among several processing units and an integrated data storage means, e.g., a memory sub-system. The distributed data transfer system includes a plurality of distributed data transfer means for connecting to the processing units. The distributed data transfer system further includes a distribution control means connected to the distributed data transfer means and the integrated data storage means. The distributed data transfer means, under the control of the distribution control means, is capable of transferring the data in divisible portions over a plurality of scheduled time periods. In a preferred embodiment, the distributed data transfer means further includes a plurality of data bus branches and a bus trunk connecting to the data bus branches. The distribution control means further includes a programmable control means for down-loading of control programs for controlling the distributed data transfers. The programmable control means further includes a plurality of finite state machines (FSMs) each including a programmable logic array for receiving the down-loading of control programs and a state register for storing a state of the FSM.

5 Claims, 9 Drawing Sheets

INTELLIGENT DISTRIBUTED DATA TRANSFER SYSTEM

BACKGROUND OF THE INVENTION

1. Field of the Invention

This invention relates generally to data bus employed in data handling systems, such as a digital video coding system, a high performance computer or digital signal processing system, wherein high volume of data are to be transferred in high speed More particularly, this invention relates to a distributed intelligent data transfer system wherein each data bus may have branches to exchange data in a flexibly divisible and distributed manner with a plurality of subsystems in parallel to reduce traffic load on the data transfer system while maintaining high bandwidth data access in its interface with an integrated data storage memory system.

2. Description of the Prior Art

The level of performance for a high speed digital data processing system, particularly for one that involves a large amount of data transfer, is often limited by bus capacity and data exchange rate with either the data storage memory or various processors. One specific example of this type of system is a digital video coding system which involves a large amount of computations and heavy data traffic between different sub-system processing units. Since the computations and data transfers between different processing units are to be carried out in real time for most video and other multimedia types of applications, the capacity of the data bus to transfer large amount of data becomes critically important. The demand of a higher data transfer rate is further heightened in the systems where massive amount of computations are carried out by parallel processing. In a system where parallel computations are performed, many processing units often require data transfers between the units and the memory at a very high rate. Frequently, the limited bus capacities and their data transfer rates become the bottle neck of the data flow thus imposing a limit on the system performance and often hinders the practical application of the parallel processing systems.

For the purpose of illustrating the difficulties encountered in the prior art, a video coding system is used to explain the data transfer requirements and various data bus designs for such system. After many years of intensive deliberation, an international low bit-rate video coding standard commonly known as CCITT (International Telegraph and Telephone Consultative Committee) Recommendation H.261 has recently been completed. The H.261 covers a wide range of bit rates at P×64 Kilo-bits per second (KBs) where P=1,2,3, . . . , 30. The video coding technique described in this Recommendation is a hybrid video compression technique of predictive coding, transform coding and entropy coding. The coding technique can be partitioned into two stages. In the first stage, the video data is first predicted by motion compensation and the residual data is compressed by transform coding. This first stage is referred to as the source coding. Since the residual data after the processes performed in the first stage are likely to be zeros, further processes to be performed in the second stage apply the Huffman coding to achieve efficient compression. The second stage is thus a variable length coding (VLC) stage.

FIG. 1 shows a block diagram of a prior art architecture for data transfer employed in a H.261 processing system 10. First, the predictive data from the multiplexer 75 is subtracted from the video input stored in the input buffer 15 by the use of a subtracting means 17. A discrete cosine transform (DCT) processing unit 20 is then used to perform a DCT transform on the processed data and a quantizer 25 then performs a quantization operation on these data before the output data is transmitted to a variable length decoder (VLC) to be further processed. At the same time, the previous frame data are to be reconstructed in order to carry out the prediction operation. The quantized data from the quantizer 25 is reconstructed to the original residual data by employing a reverse quantizer 30 and an inverse ICT processing unit (IDCT) 35 to perform a reverse quantization and IDCT operation on the data. The reconstructed residual data is summed by the use of a summing means 40 to the delayed predictive data and then stored in the previous frame memory 45. The delayed predictive data is received from a loop delay unit 50 which delays the data transmission by a duration required for the total processing time used in the aforementioned transformations and quantizations. In order to perform the prediction, a motion estimator 55 finds the best matching block in the previous frame when compared to each of current blocks. A motion vector is generated representing the relative motion of the current block to the best matching block, i.e., the block which has the least different value of the least mean square or least mean absolute from the current block. The motion vector generated by the motion estimator 55 is then used by a motion compensation processing unit 60 to compensate the previous frame data received from the previous frame memory 45. The compensated data from the motion compensation processing unit 60 is then filtered by a loop filter 65 to filter out processing noises and irregular data spikes caused by the blocking effect. The inter/intra (I/I) decision unit 70 and the multiplexer 75 are then used to control whether to turn on the prediction based on I/I decision rule. The I/I decision rule is a decision curve, e.g. a non-linear decision curve of RM 8 recommended by CCITT. The decision curve is a function of two parameters relating to the variation of the original data and variation of the residual data. The variation is calculated micro block by micro block. If the variation of the original data is more significant than the residual data, the multiplexer 75 is turned on to perform the function of prediction. Otherwise, the multiplexer 75 is turned off without requiring to perform prediction because there is no significant similarity between successive frames of data.

The encoder 10 as shown in FIG. 1 is much more complex than the conventional encoder for still image. More computations are involved which requires more data transfer between different processing units. Since the video encoder is frequently to be used in real time application, the data processing and the transfer are to be carried out at very high speed. In the processing system 10, at any given time, these processing units are required to process and exchange several million bytes of data. The processing units often have multiple ports for input and output and often these ports are required to execute data exchange simultaneously. For example, 30 frame per second of video data are to be processed under the CIF standard. The previous frame memory 45 and the input buffer must provide three ports for providing data to the motion estimator 55 at the rate of 3-mega bytes per second on each port. Also, the previous frame memory 45 must send data to the motion compensation processing unit 60 and also receives data from the adder 40 simultaneously at the rate of 4.5-mega bytes per second. As these input/output (I/O) operations must be carried out in parallel, the previous frame memory 45 must have multiple I/O ports. The same requirement is also applicable to most of the processing units used in this encoding system 10.

In a highly complicated high-performance multiprocessor system such as this encoding system 10, one critical issue is how to arrange the configuration of the data storage memory and the connectivity and management of data access between these processing units and the memory storage(s). Because the higher cost of the multi-port memory, in order to reduce cost, one simple option is to use a single port memory. FIG. 2 shows such a prior art memory and data bus arrangements for the coding system as shown in FIG. 1 where two buses, i.e., a bus 80 and another bus 85, are used. The bus 80 is connected to the input buffer 15 and the bus 85 is connected to the previous frame memory 45, the motion estimator 55, and the loop filter 65. In order to implement the loop delay, another data bus 88 is required to connect to the loop delay unit 50. With these data buses, the system configuration becomes quite complicate and the cost saving as the result from the use of single port memory is offset by the additional costs required by adding more data buses and the extra hardware and software interfaces associated with these added data buses.

A system architecture which may be used to reduce the number of data buses is to combine all these blocks of data into a single memory. The combined single memory also has the benefit that the address scheme by different processing units for the entire system is greatly simplified. However, a system architecture employing this combined single memory presents a different technical difficulty due to the high volume of data required to be transferred in and out of the memory. The very heavy 'data traffic' often causes a 'traffic jam' on the data bus(es) connecting the memory to different processing units. The system performance is adversely affected by the bottleneck on the data bus which limits the data flow in this single memory system. Moreover, as many processing units in a video coding system often requires multi-ports data I/O operations to be simultaneously performed, a configuration in providing only a single bus for communication with all processing units is not achievable. The cost saving that can be potentially realized by the use of a single memory would be further decreased when multiple data buses are still required in order to transfer data between one single memory to many different processing units.

In U.S. Pat. No. 4,903,227 (issued on Feb. 2, 1990) entitled 'Processor for Digitized Video Having Common Bus for Real Time Transfer of Input and Output Video Data', Fukushima et al. disclose a method to achieve high speed video data transfer in real time by connecting a pair of bus controller to a common bus for passing data from an incoming digitizing circuitry to output circuitry which converts the digitized data into video signals. A memory is connected by another bus to a computer and a bus interface or a selective dual ports of the memory selectively connects the memory bus to the common digital data bus so that the digitized signals are written and read from the memory in real time in accordance with the high speed timing signals and corresponding address signals. Fukushima et al. employ a pair of controller to synchronize the timing between the memory access and the video signal processing to obtain higher data transfer rate for real time operation. This pair of controller with two data buses cannot provide a solution to the difficulties caused by the need to process and exchange large volume of data in high bandwidth demanded by the modern video signal processing systems.

Nishitani et al. disclose in U.S. Pat. No. 4,942,470, entitled 'Real Time Processor for Video Signals' a video signal processor including a plurality of unit processors. Each unit processor has an input port and an output port for connecting to an input bus and an output bus respectively in parallel. Each unit processor then generates a control signal to the input and output buses. The basic concept is to divide the video signals to be processed into segmented units and then process each segment independently in parallel. The speed of processing may be increased because of the parallel processes which are simultaneously performed by multiple unit processors. This method can become very complicate and expensive. Additional, the critical problem of data transfer rate on a single input bus and output may still be the bottleneck in limiting the speed of the video system due to the demand for transferring large amount of data on the data bus in a very high bandwidth to satisfy the real time requirements.

In U.S. Pat. No. 5,126,845 entitled 'Pipeline Bus Having Registers and Selector for Real-time Video Signal Processing', Yamashita et al. disclose a pipeline bus having a plurality of slots in a backplane for receiving functional modules. A bus line is connected between the slots. A register and a selector are provided between each adjacent slots. An image signal and a synchronization signal are transmitted from upper to lower slots in synchronization with the clock signal. The selector outputs a signal either from the register or from the associated functional module to a downstream register. A system configuration with the pipeline bus as disclosed by Yamashita et. is based on the concept that the entire task of video signal processing can be 'streamlined' into pipeline-stages. The data processed by one stage is a 'finished package' to be transmitted to a next stage. Such system architecture may be very suitable for operations which are either simple or straightforward such as the multiplication of two numbers. A pipeline design would become very rigid for a more complicate process which requires feedback or bias-error corrections such as a system for video signal process wherein the pixel data from a previous frame are commonly used as reference and ghost cancellation may require the processing of video data received with variable delay transmission time. Furthermore, the basic problem of large volume data to be transferred through data buses with limited capacity is still a major difficulty not resolved by the pipeline technique.

Therefore, there is still a need in the art of system architecture for higher bandwidth data processing systems, particularly for those systems that handle large volume of data processing and high speed exchanges, to provide a data transfer apparatus and interface management technique to overcome the above described limitations.

SUMMARY OF THE PRESENT INVENTION

It is therefore an object of the present invention to provide a system architecture which utilizes an intelligent distributed data transfer system and a programmable data transfer control process to overcome the aforementioned difficulties encountered in the prior art.

Specifically, it is an object of the present invention to provide a system architecture which utilizes an intelligent distributed data transfer system and a programmable data transfer control process to reduce the traffic load of the data buses while increase the data transfer rate between different processing units without being limited by the data handling capacity of any single bus.

Another object of the present invention is to provide a system architecture which utilizes an intelligent distributed data transfer system including a plurality of bus branches controlled by a programmable controller capable of dynamically switching between the data bus branches for controlling access with an integrated memory while maintaining continuous data communication with several processing units such that the limitation of utilizing a single data bus can be resolved.

Another object of the present invention is to provide a system architecture with an intelligent distributed data transfer system including a plurality of bus branches controlled by a programmable controller wherein a new data transfer method is used that a data item may be transferred as divisible portions over several scheduled time periods by different data bus branches such that the traffic load of the data bus can be reduced because of this more continuous and pipeline method of data transfer.

Briefly, in a preferred embodiment, the present invention discloses a distributed data transfer system for transferring data among several processing units and an integrated data storage means. The distributed data transfer system comprises a plurality of distributed data transfer means for connecting to the processing units. The distributed data transfer system further includes a distribution control means connected to the distributed data transfer means and the integrated data storage means. The distributed data transfer means controlled by the distribution control means is capable of transferring the data in divisible portions over a plurality of scheduled time periods. In a preferred embodiment, the distributed data transfer means further includes a plurality of data bus branches and a bus trunk connecting to the data bus branches. The distribution control means further includes a programmable control means for down-loading of control programs for controlling the distributed data transfers. The programmable control means further includes a plurality of finite state machines (FSMs) each including a programmable logic array for receiving the down-loading of control programs and a state register for storing a state of the FSM.

It is an advantage of the present invention that the it provides system architecture which utilizes an intelligent distributed data transfer system and a programmable data transfer control process to reduce the data traffic load of the buses while increase the data transfer rate between different data-processing units without being limited by the data handling capacity of any single bus.

Another advantage of the present invention is that it provides a system architecture which utilizes an intelligent distributed data transfer system including a plurality of bus branches controlled by a programmable controller capable of dynamically switching between the data bus branches for controlling access with an integrated memory while maintaining continuous data communication with several processing units such that the limitation of utilizing a single data bus can be resolved.

Another advantage of the present invention is that it provides a system architecture with an intelligent distributed data transfer system including a plurality of bus branches controlled by a programmable controller wherein a new data transfer method is used that a data item may be transferred as divisible portions over several scheduled time periods by different data bus branches such that the traffic load of the data bus can be reduced because of this more continuous and pipeline method of data transfer.

These and other objects and advantages of the present invention will no doubt become obvious to those of ordinary skill in the art after having read the following detailed description of the preferred embodiment which is illustrated in the various drawing figures.

DETAILED DESCRIPTION OF THE PREFERRED EMBODIMENT

Figure 3:
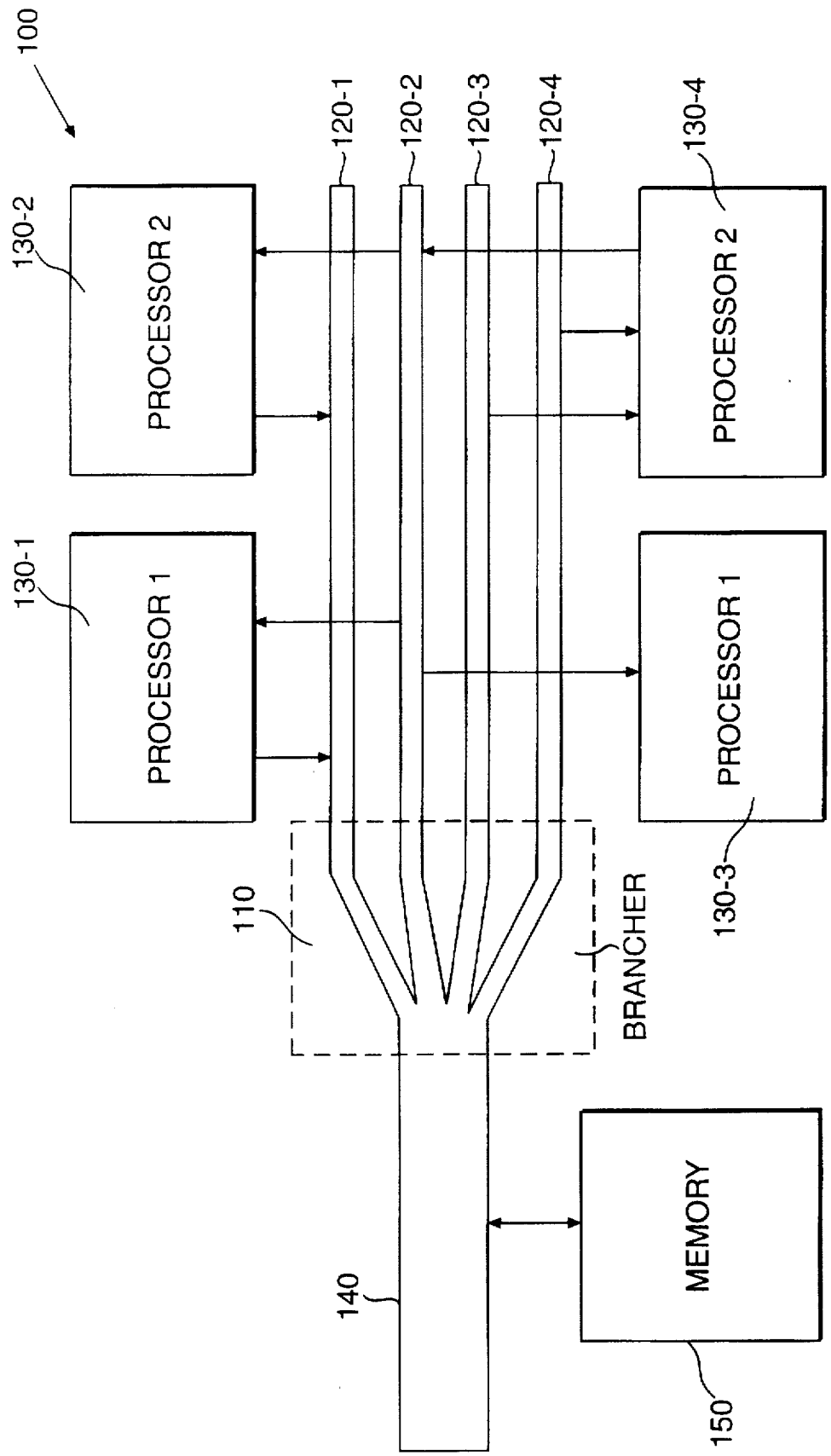
FIG. 3 is a functional block diagram of an intelligent distributed data transfer system utilizing data bus branches according to the present invention.

FIG. 3 shows the basic configuration of an intelligent distributed data transfer system 100 according to the present invention. The distributed data transfer system 100 include a distribution control means 110 which is connected to a plurality of distributed data transfer means 120, i.e., data bus branches 120-1 to 120-4 as shown in FIG. 3, for performing a task of exchanging data with a plurality of data processors 130, i.e., 130-1.to 130-4. The distribution control means 110 further includes a memory access means 140 which may be connected to an integrated data storage means 150, i.e., a memory 150, to exchange data with the memory 150. The distributed data transfer system 100 serves as a 'data-highway with multiple lanes', i.e., a plurality of data transfer means 120, to allow a plurality of data processors 130 to share the data stored in the memory 150. This type of architecture is particularly useful for synchronization types of digital signal processing such as a video data receiver. Synchronized data transmission can be performed in parallel under the control of the distribution control means 110 in a sequential and continuous manner without having to manage each data item to be transferred as an indivisible 'discrete' item. The bus utilization can be increased by the use of this technique because the data transfer system 100 provides several bus branches which can be utilized by different processing units simultaneously. For example, when two processing units, i.e., the processors 130-1 and 130-2, need to access the memory 150 wherein the first processing unit 130-1 is required to read three bytes of data each cycle and the second processing units 130-2 needs to write one byte of data each cycle. In a conventional data bus architecture, a bus arbitrator is employed which would then arrange the first processing unit 130-1 to 'occupy' one clock cycle to read the data while the second processing unit 130-2 to 'occupy' another clock cycle to write the data to the memory 150. In contrast, in the distributed data transfer system 100 as taught in the present invention, the read and the write operations to be performed by the processing units 130-1 and 130-2 respectively can be carried out in the same clock cycle. The first three branches 120-1 to 120-3 can be assigned to the first processing unit 130-1 for the reading of the data while the last data branch 120-4 can be assigned to the second processing unit 130-2 for the writing of the data to the memory 150.

Therefore, the present invention teaches an entirely new concept in the design of managing the data transfer among several processors. The prior art system architecture utilizes the data bus for data transfer which was treated merely as a hardware connection under the control of a data bus controller for transmitting electrical pulses representing the binary bits. Limited by this design concept, each data item either generated by a processor or read from the memory is required to be transmitted on the data bus as an 'integrated unit' and the transmission and exchange of data are also required to be completed in a 'specific indivisible time slot' during that time the entire data bus is 'busy' and occupied thus preventing the transmission or exchange of other data item from being executed. The present invention takes advantage of the fact that many of the modern data handling systems process a large volume of data in a synchronous manner. Specific examples are video or audio data processing systems wherein a large amount of data are to be transferred between several processing units and the memory by the use of specific 'sync bit-pattern' for synchronization. Under that condition, a data of very long bit length can actually be divided into several sub-units, and the sub-units from different processors can be transmitted in the branched data buses in a sequential and synchronized manner. A more flexible schedule can be arranged to perform the data transfer such that the data can be 'propagated' in a continuous and pipelined manner according to streamline of the data processing and management requirement. Because of recent hardware and software advancements, such arrangements can be made with either hardware or software means to achieve optimal efficiency according to the system requirements. It thus liberalizes the system design from the old concept that the data transfer between different operational units must be handled by a 'dumb data bus' with fixed bit-width and limited time slots which imposes many design constraints to the system performance. Rather, the data bus transfer system can be intelligently controlled and managed with great deal of configuration variations allowing more design flexibility to best suit the specific application for which the system is design for.

Figure 4:
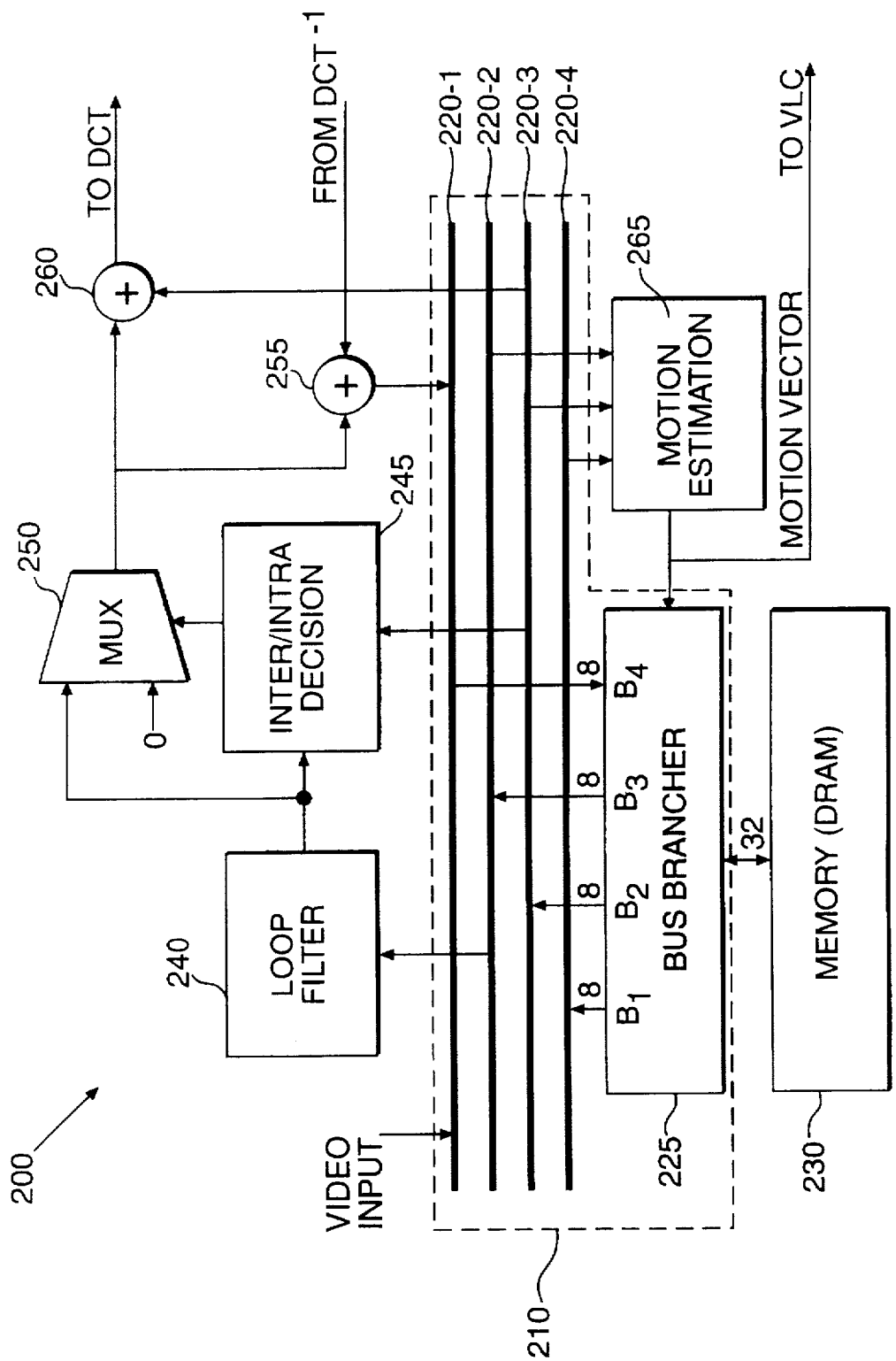
FIG. 4 is a functional block diagram of a signal processing system including an intelligent distributed data transfer subsystem according to the present invention.

FIG. 4 shows a signal processing system 200 which includes an intelligent data transfer subsystem 210 according to the present invention. The data transfer subsystem 210 includes a plurality of data bus branches 220 controlled by data transfer control means, i.e., a bus brancher 225 which has a port to interface with each of the data bus branches 220. The data bus brancher 225 also interface with data storage means, a dynamic random access memory (DRAM) 230. Each of the data bus branches 220 is also connected to one or several data processing units, e.g., a loop filter 240, an I/I decision circuit 245, a multiplexer 250, a first summing means 255, a second summing means 260, and a motion estimation means 265.

Figure 1:
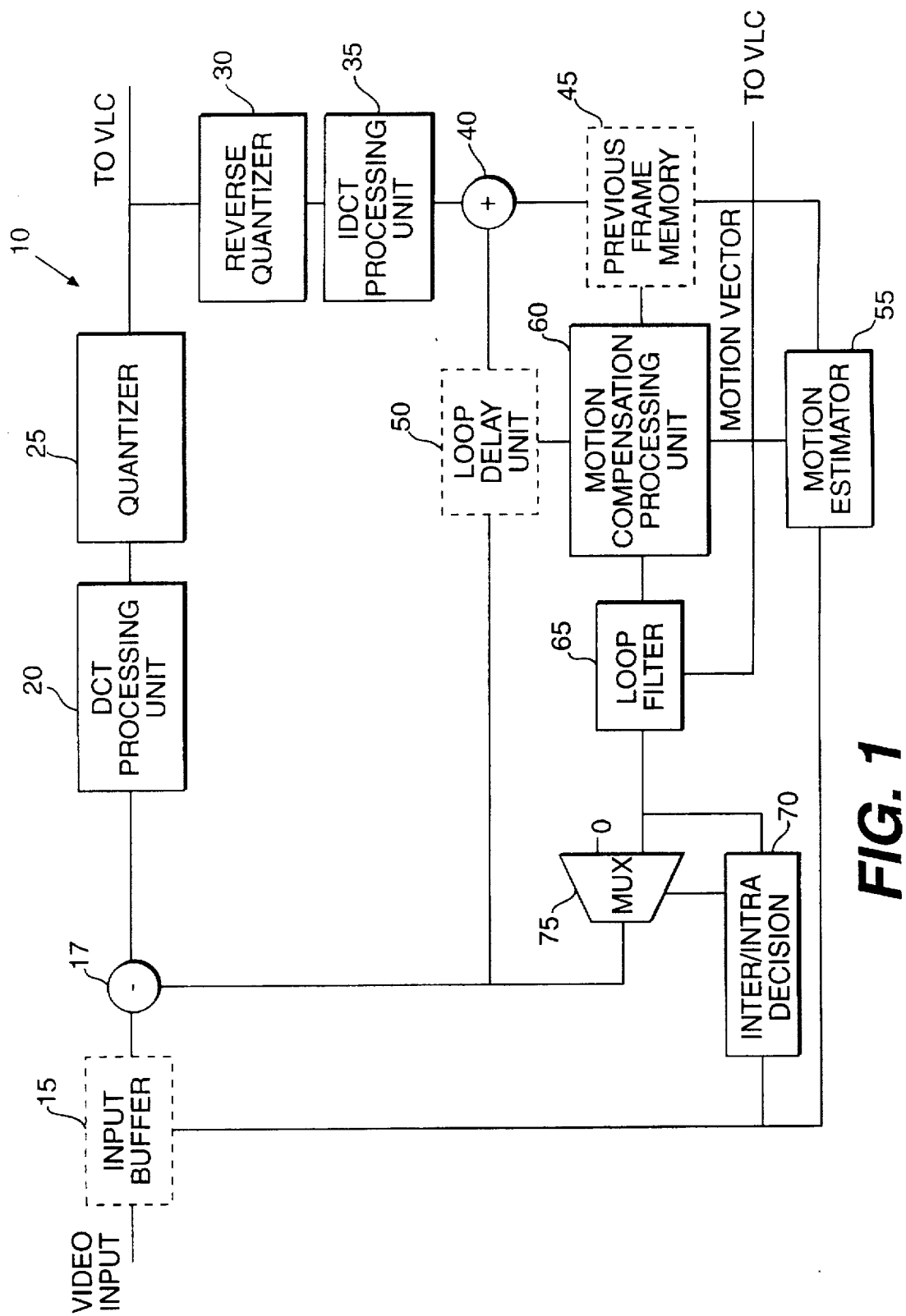
FIG. 1 is a block diagram of a prior art architecture for data transfer employed in a H.261 processing system.
Figure 2:
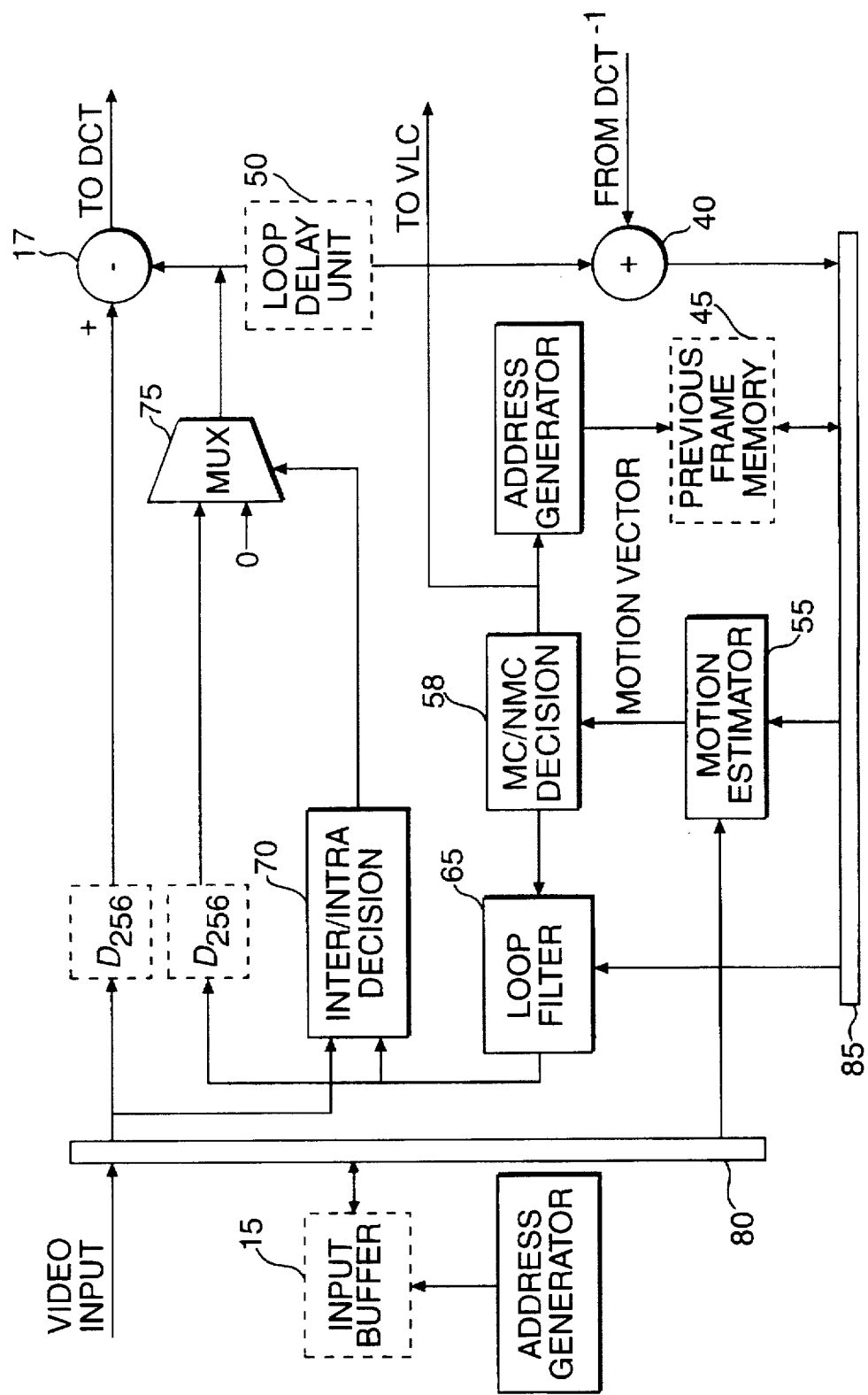
FIG. 2 is a block diagram of a video data encoder using a single port memory.

By the use of the data transfer subsystem 210, each of the inter-connected processing units can share the data stored in the memory. Meanwhile, the heavy load, especially the burst transfer rate, on each data bus which limits the performance of the data processing system 200 is now greatly reduced. Unlike the conventional design where the design bus load should have enough capacity to accommodate the maximum data transfer rate, the data transfer subsystem 210 dynamically distributes data to each of these bus branches 220-1 to 220-4. For example, in the prior art design, the bus connected to the previous memory in FIG. 1 would require a burst data transfer capacity of up to five times the video pixel rate. In comparison, each bus branch 220-1 to 220-4 in the distributed data transfer subsystem 210 of the present invention would only require to carry a data transfer load of up to three times the video pixel rate. Because the overall load of data transfer can be dynamically distributed among different data bus branches, e.g., 220-1 to 220-4, the burst load of each data bus branch is reduced.

A method for transferring data among several processing units, i.e., the motion estimation unit 265, the I/I decision processor 245, etc., and an integrated data storage means 230 is also disclosed in the present invention. The data transfer method comprising the steps of (a) connecting a plurality of distributed data transfer means 220-1 to 220-4 including a plurality of data bus branches and a bus trunk connecting to the data bus branches to the processing units and the data storage means 230; and (b) controlling the distributed data transfer means 220 and the integrated data storage means 230 for transferring the data in divisible portions over a plurality of scheduled time periods via the data bus branches 220-1 to 220-4.

Figure 5:
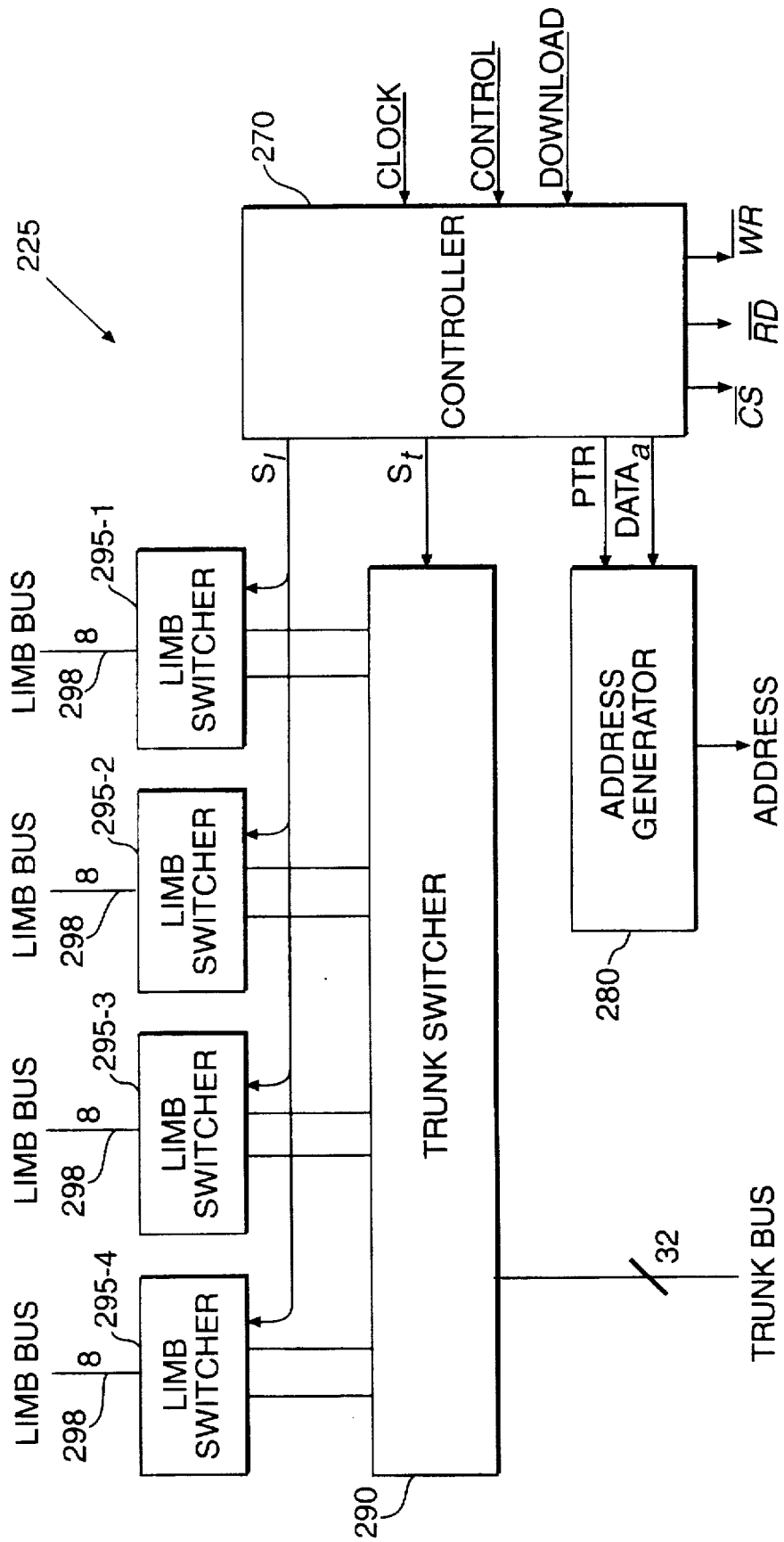
FIG. 5 is a functional block diagram of a bus branches for controlling the distributed data transfer among the data bus branches.

FIG. 5 shows a preferred embodiment of the data transfer control means, i.e., the bus brancher 225. The bus brancher 225 includes a controller 270 which controls an address generator 280, a truck switcher 290 which in turn controls several limb switchers 295 connecting to a limb bus 298, each connection to one of the bus branches 220. The controller 270 controls the four limb switches 295 via the control signals SI and via the trunk switcher via $S_r$. Each limb switcher 295 is turned on or off under the control of the controller 270 which receives a clock signal, a control signal and download signal to generate read (RD), write( WR) or chip-select (CS) commands to the memory. To access the memory, the memory address is generated by the address generator 280 which receives a pointer (PTR) and data (DATAa) input from the controller 270. The address generator 280 then generates an address input to the memory 230 for the access of data stored in the memory 230. The details of the design and operation of the address generator 280 is further explained in the description of FIG. 6 below.

Figure 6:
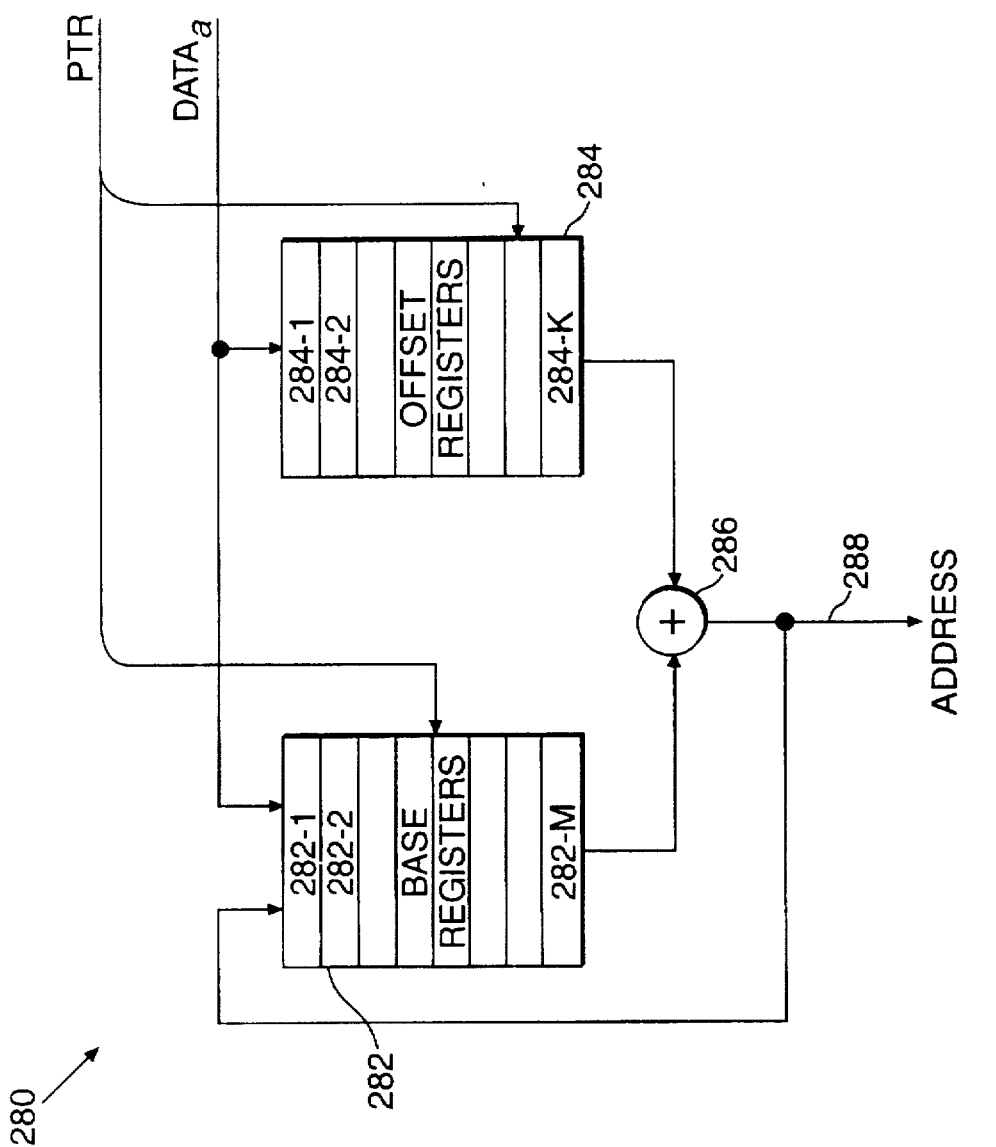
FIG. 6 is a functional block diagram of an address generator for accessing the memory.

FIG. 6 is a functional block diagram of the address generator 280 which has two register banks. The first register is a base register bank 282 which includes a plurality of registers, i.e., 282-1,282,2, . . . ,282-M to store address for memory access. These addresses are received from the controller 270 and from the adder 286. The second register bank is an offset register bank 284 which includes a plurality of registers 284-1, 284-2, . . . , 284-K to store various offsets of addresses before the memory access is executed. These offset values are downloaded by the controller 270. The pointer PTR from the controller 270 is used to select which base register, i.e., 282-i, and offset register, 284-j, are to be activated. For the purpose of address generation, the PTR will select a base register and an offset register to generate the final address via the adder 286. In the meantime, the final address is also stored into the register pointed by the PTR while the PTR is also being used to select a register for the loading of the data when the data are being imported from the data line DATAa.

Figure 7:
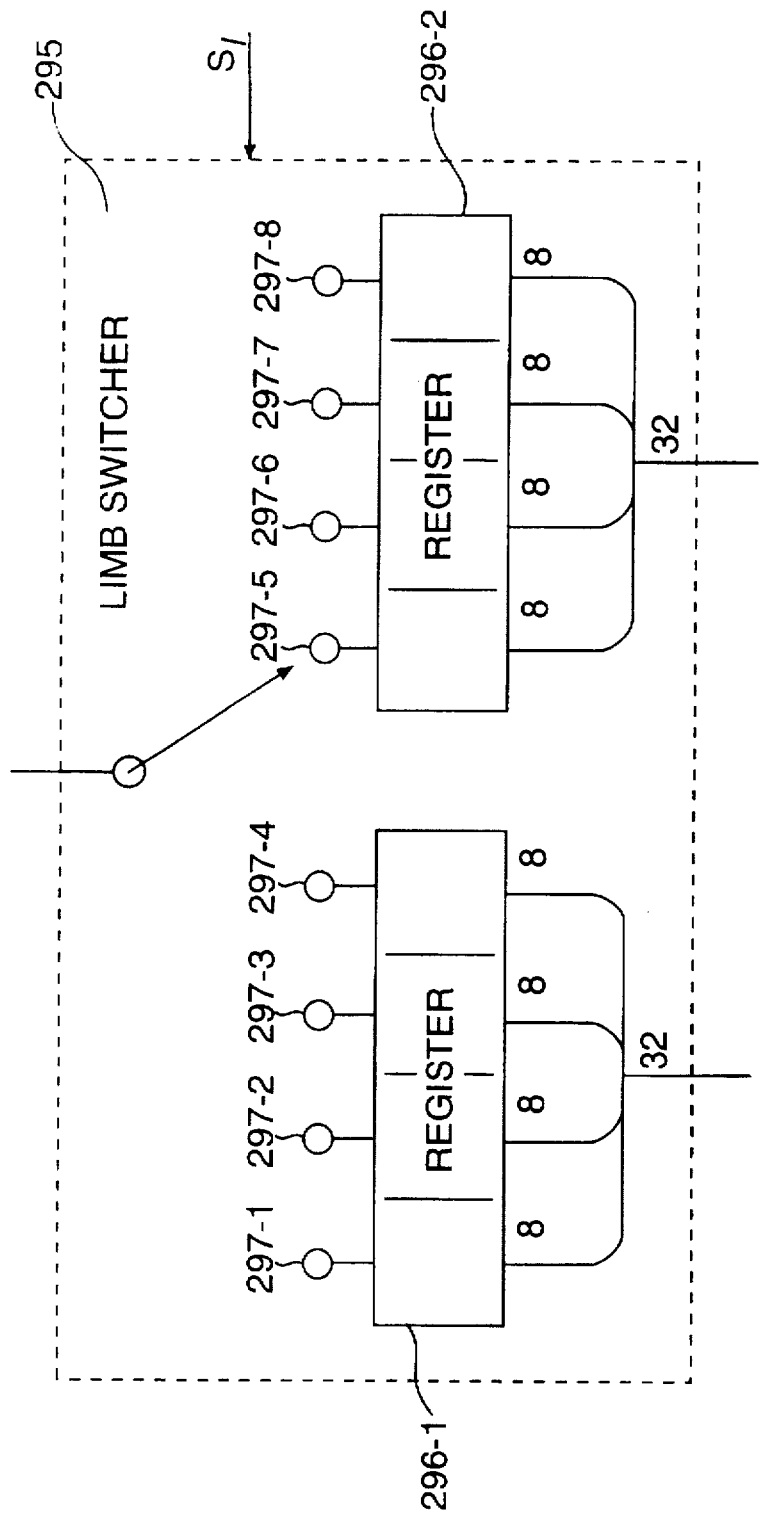
FIG. 7 is a structural diagram showing the configuration of a limb switcher for performing the switching actions among different data bus branches.

FIG. 7 shows the structure of the limb switcher, i.e., limb switchers 295-1 to 295-4 as shown in FIG. 5. Reflecting to FIG.7, each limb switcher 295-k, k=1 to 4, has two 32-bit registers, i.e., a register 296-1 and a register 296-2, and each register has four switching connectors, i.e., 297-1 to 297-8. Each of the switching connectors 297-1 to 297-8 is connected to a sub-register of eight bits in the registers 296-1 and 296-2. The limb switcher 295 is controlled by the switch control signal $S_l$ received from the controller 270 to selectively connect to one of these eight switching connectors 297-j where j=1 to 8.

Figure 8:
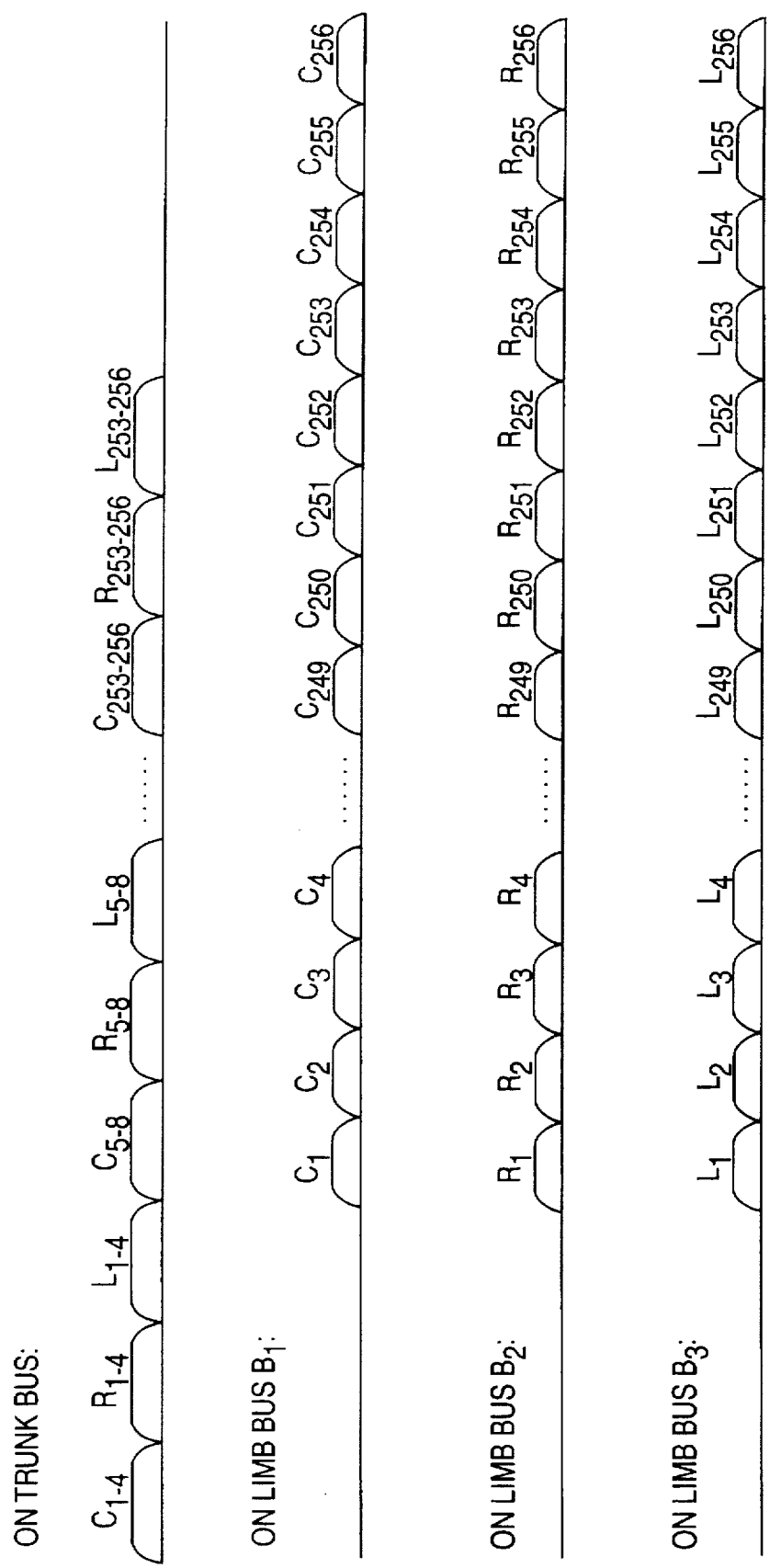
FIG. 8 is the timing diagram showing the time sequence of the data transfer in the distributed data transfer system.

FIG. 8 is an example timing diagram for illustrating the time sequence of the data transfer by the distributed data transfer sub-system 210 in the data processing system 200. The motion estimation to be performed by the motion estimation means 265 requires three sequences of data simultaneously. The first sequence of data is from the current frame which is denoted as C-type of data on the timing diagram. A second and third sequences of data are the right sequence or left sequence from the previous frame, denoted as R-type and L-type of data. The bus brancher 225 receives the required data of four bytes each time by selectively connecting, at different time slots, to different switching connectors 297 for reading the data which are stored in different registers in different registers in the limb switcher 296. Since the limb switcher has two registers and each has four sub-register of 8-bit which can receive data from any of the external controller (not shown), the data on each bus can be continuously retrieved from one register while the other register is being updated with a new set of data without waiting.

Figures 9, 10:
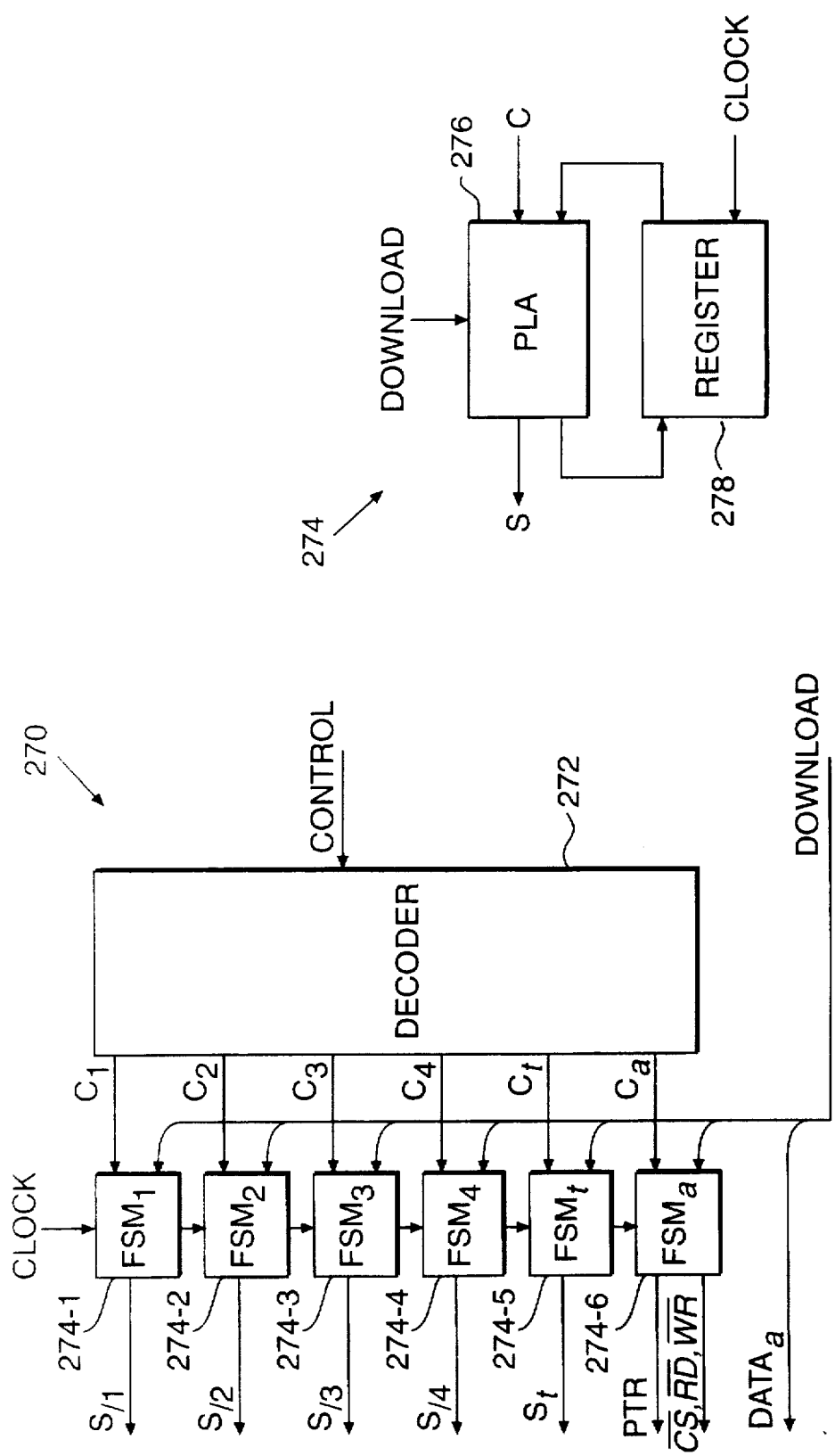
FIG. 9 is a functional block diagram of a controller for decoding a control signal on the data bus branches.
FIG. 10 is a functional block diagram of a finite state machine (FSM) including a PLA and a state register.

FIG. 9 shows the block diagram of the controller 270 which includes a decoder 272 to receive and decode a control signal from one of the data bus branches 220. The decoded control signals are then inputted to the finite state machines (FSMs). In a preferred embodiment, there are six FSMs 274-1 to 274-6 for the control of the switching the generation of the addresses for memory access. The first four FSMs are employed to control the four limb switchers 295-k, k=1 to 4, and the FSMt, i.e., FSM 274-5, is used to control the trunk switching, while the last FSMa, i.e., the FSM 274-6, is used to control the generation of the address and also is used for providing other memory control signals. To provide the greatest degree of design and operational flexibilities, the FSM can be programmable by the use of either software, firmware or hardware means and can be downloaded from external programming means which would be most suitable for the application of the system. One of the preferred embodiments of the FSMs 274 is shown in FIG. 10 wherein an FSM 274 is shown to include a programmable logic array (PLA) 276 and a state register 278. A control signal C is received by the PLA 276 to change the state of the FSM 274. An output signal S is generated to control the trunk switcher 290 and the limb switcher 295, or the address generator 280.

In summary, the present invention discloses a distributed data transfer system 210 for transferring data among several processing units, i.e., the motion estimation unit 265, the I/I decision processor 245, etc., and an integrated data storage means 230. The distributed data transfer system 210 comprises a plurality of distributed data transfer means 220 for connecting to the processing units. The distributed data transfer system 210 further includes a distribution control means 225 connected to the distributed data transfer means 220 and the integrated data storage means 230. The distributed data transfer means 220 controlled by the distribution control means 225 is capable of transferring the data in divisible portions over a plurality of scheduled time periods (See FIG. 8). In a preferred embodiment, the distributed data transfer means further includes a plurality of data bus branches, e.g., data bus branches 220-i, i=1 to 4, and a bus trunk 140 connecting to the data bus branches 220-i, i=1 to 4. The distribution control means 225 further includes a programmable control means 270 for down-loading of control programs for controlling the distributed data transfers. The programmable control means further includes a plurality of finite state machines (FSMs), e.g., FSMs 274-j, j=1 to 6, each including a programmable logic array 276 for receiving the down-loading of control programs and a state register 278 for storing a state of the FSM 274.

More specifically, a distributed data transfer system 210 for transferring data among several processing units, i.e., the motion estimation unit 265, the I/I decision processor 245, etc., and an integrated data storage means 230 is disclosed by the present invention. The distributed data transfer system 210 comprises a plurality of distributed data transfer means 220 for connecting to the processing units wherein the distributed data transfer means 220 further including a plurality of data bus branches, i.e., 220-1 to 220-4 and a bus trunk 140 connecting to the data bus branches 220-1 to 220-4. The data transfer system 210 further includes a distribution control means 225 connected to the distributed data transfer means 220 and the integrated data storage means 230 wherein the distribution control means 235 further includes a programmable control means 270 for down-loading of control programs for controlling the distributed data transfers. The programmable control means 270 further includes a plurality of finite state machines (FSMs), i.e., 274-1 to 274-6, each including a programmable logic array 276 for receiving the down-loading of control programs and a state register 278 for storing a state of the FSM. The distribution control means 235 further includes a trunk switcher 290 controlled by the programmable control means 270 for dynamically switching the control means for connecting to at least one of the data bus branches 220-1 to 220-4. The distribution control means 235 further includes an address generator 280 controlled by the programmable control means 270 for generating an address in the integrated memory 230 for accessing data in the memory 230. The trunk switcher 290 further includes a plurality of limb switcher, i.e., 295-1 to 295-4, each connected to one of the data bus branches 220-1 to 220-4. Each of the limb switches 295-1 to 295-4 further includes a plurality of registers 296-1 and 296-2 for temporarily storing data from the connected data bus branch 220-1 to 220-4. Each of the registers 296-1 and 296-2 in the limb switches 295 further includes a plurality of sub-registers for storing the divisible portion of the transferred data. The distributed data transfer means 220 controlled by the distribution control means 235 is capable of transferring the data in divisible portions over a plurality of scheduled time periods (See FIG. 8).

Therefore, the present invention is able to overcome the difficulties encountered in the prior art by providing a system architecture which utilizes an intelligent distributed data transfer system and a programmable data transfer control process. By using the data bus branches, the traffic load of the data buses is reduced and the data transfer rate between different processing units is increased. The performance level of the system is no longer limited by the data handling capacity of any single bus. The programmable controller is capable of dynamically switching between the data bus branches for controlling access with an integrated memory while maintaining continuous data communication with several processing units such that the limitations of utilizing a single data bus are thus eliminated. Furthermore, this invention teaches a new data transfer method that a data item may be transferred as divisible portions over several scheduled time periods by different data bus branches such that the traffic load of the data bus can be reduced because of this more continuous and pipeline method of data transfer. The designers of a data handling system which utilizes the system architecture and the distributed data transfer method of the present invention are provided with greater flexibility to manage the data transfer among many processing units without being limited by the conventional concept of managing each data item as a 'discrete unit' to be transferred in a single data bus with fixed bit-width over a discrete time slot.

The video signal encoder as shown in FIG. 4 is only one example which is described above for the purpose of illustration. The system architecture and the distributed data transfer control process as disclosed in the present invention can be applied to many other digital signal processing systems and digital communication and data processing systems to improve the bandwidth of the data transfer and to increase the system performance.

Although the present invention has been described in terms of the presently preferred embodiment, it is to be understood that such disclosure is not to be interpreted as limiting. Various alternations and modifications will no doubt become apparent to those skilled in the art after reading the above disclosure. Accordingly, it is intended that the appended claims be interpreted as covering all alternations and modifications as fall within the true spirit and scope of the invention.

I claim:

1. A distributed data transfer system for transferring data among several processing units and integrated data storage means, comprising:

a plurality of distributed data transfer data transfer means for connecting to each of said processing units;

integrated distribution control means connected to said plurality of distributed data transfer means for monitoring and controlling timing and sequence of transferring data in each of said distributed data transfer means;

said plurality of distributed data transfer means having said timing and sequence of data transfer controlled by said integrated distribution control means for transferring said data in divisible portions over a plurality of scheduled time periods;

said plurality of distributed data transfer means further includes a plurality of data bus branches and a bus trunk, said bus trunk connecting between said integrated data storage means and said integrated distribution control means, and said plurality of data bus branches connecting between said integrated distribution control means and said several processing units;

said integrated distribution control means controls and coordinates said timing and sequence of data transfer from said bus trunk to each of said data bus branches;

said integrated distribution control means further includes programmable control means for down-loading of control programs for changing schemes of controlling and coordinating said timing and sequence of data transfer from said bus trunk to each of said data bus branches; and said programmable control means further includes a plurality of finite state machines (FSMs) for each of said data bus branches wherein each of said FSMs includes a programmable logic array for receiving said down-loading of control programs and a state register for storing a state of said FSM;

each of said FSMs receiving a control signal from said integrated distribution control means for directing and coordinating a transfer of data on each of said data bus branches.

2. A distributed data transfer system for transferring data among several processing units and integrated data storage means, comprising:

a plurality of distributed data transfer data transfer means for connecting to each of said processing units;

integrated distribution control means connected to said plurality of distributed data transfer means for monitoring and controlling timing and sequence of transferring data in each of said distributed data transfer means;

said plurality of distributed data transfer means having said timing and sequence of data transfer controlled by said integrated distribution control means for transferring said data in divisible portions over a plurality of scheduled time periods; said plurality of distributed data transfer means further includes a plurality of data bus branches and a bus trunk, said bus trunk connecting between said integrated data storage means and said integrated distribution control means, and said plurality of data bus branches connecting between said integrated distribution control means and said several processing units;

said integrated distribution control means controls and coordinates said timing and sequence of data transfer from said bus trunk to each of said data bus branches;

said integrated distribution control means further includes programmable control means for down-loading of control programs for changing schemes of controlling and coordinating said timing and sequence of data transfer from said bus trunk to each of said data bus branches;

said integrated distribution control means further includes a trunk switcher controlled by said programmable control means for dynamically switching said trunk switcher for connecting to at least one of said data bus branches for transferring data to said several processing units; and said integrated distribution control means further includes an address generator controlled by said programmable control means for generating an address in said integrated date storage means for accessing data stored therein.

3. The data transfer system of claim 2 wherein:

said trunk switcher further includes a plurality of limb switches each connected to one of said data bus branches; and each of said limb switches further includes a plurality of registers for temporarily storing data from said data bus branch connected thereto.

4. The data transfer system of claim 3 wherein:

each of said registers in said limb switches further includes a plurality of sub-registers for storing said divisible portion of said transferred data.

5. A distributed data transfer system for transferring data among several processing units and integrated data storage means, said distributed data transfer system comprising:

a plurality of distributed data transfer means for connecting to said processing units including a plurality of data bus branches and a bus trunk;

integrated distribution control means wherein said bus trunk is connected between said integrated data storage means and said plurality of integrated distribution control means, and said plurality of data bus branches connected between said integrated distribution control means and said several processing units;

wherein said integrated distribution control means monitors and controls timing and sequence of data transfer from said bus trunk to each of said data bus branches;

said distribution control means further including programmable control means for down-loading of control programs for controlling data transfers in each of said data bus branches;

said programmable control means further including a plurality of finite state machines (FSMs) for each of said data bus branches wherein each of said FSMs includes a programmable logic array for receiving said down-loading of control programs and a state register for storing a state of said FSM;

each of said FSMs receiving a control signal from said integrated distribution control means for directing and coordinating a transfer of data on each of said data bus branches;

said integrated distribution control means further including a trunk switcher controlled by said programmable control means for dynamically switching said trunk switcher for connecting to at least one of said data bus branches for transferring data to said several processing units;

said integrated distribution control means further including an address generator controlled by said programmable control means for generating an address in said integrated data storage means for accessing data stored therein;

said trunk switcher further including a plurality of limb switches each connected to one of said data bus branches;

each of said limb switches further including a plurality of registers for temporarily storing data from said data bus branch connected thereto;

each of said registers in said limb switches further including a plurality of sub-registers for storing a divisible portion of said transferred data; and wherein said plurality of distributed data transfer means with said timing and sequence of data transfer controlled by said single integrated distribution control means is coordinated for transferring said data in divisible portions over a plurality of scheduled time periods whereby said single integrated distribution control means is provided to control said timing and sequence for data transfer in each of said data bus branches in a time unit for transferring said divisible portion of said data.

* * * * *